United States Patent
Park

(10) Patent No.: US 7,777,827 B2
(45) Date of Patent: Aug. 17, 2010

(54) TOP FRAME WITH SEPARABLE PORTIONS FOR A LIQUID CRYSTAL DISPLAY DEVICE

(75) Inventor: Chul Park, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 419 days.

(21) Appl. No.: 11/319,559

(22) Filed: Dec. 29, 2005

(65) Prior Publication Data

US 2006/0290833 A1    Dec. 28, 2006

(30) Foreign Application Priority Data

Jun. 23, 2005 (KR) .................. 10-2005-0054535

(51) Int. Cl.
*G02F 1/1333* (2006.01)
*F21V 7/04* (2006.01)

(52) U.S. Cl. .................. 349/58; 362/632; 362/633; 362/634

(58) Field of Classification Search ............. 349/58–60; 361/681; 362/632–634

See application file for complete search history.

(56) References Cited

U.S. PATENT DOCUMENTS 7,178,967 B2* 2/2007 Kim .................. 362/633

2002/0054249 A1* 5/2002 Ryu et al. .................. 349/58
2003/0160908 A1* 8/2003 Peng .................. 349/58
2004/0246401 A1* 12/2004 Lee et al. .................. 349/58
2005/0168954 A1* 8/2005 Kim .................. 361/725

FOREIGN PATENT DOCUMENTS

| | | |
|---|---|---|
| CN | 1352406 | 6/2002 |
| CN | 2671078 | 1/2005 |
| CN | 1598664 | 3/2005 |
| JP | 2000039850 A * | 2/2000 |

* cited by examiner

*Primary Examiner*—David Nelms
*Assistant Examiner*—Jessica M Merlin
(74) *Attorney, Agent, or Firm*—Morgan Lewis & Bockius LLP

(57) ABSTRACT

A liquid crystal display device includes a bottom frame, a main frame over the bottom frame and having a substantially rectangular shape, a backlight unit over the main frame, the backlight unit including a reflecting plate, a light guide plate over the reflecting plate, a lamp at one side of the light guide plate, a lamp guide covering the lamp, and optical sheets over the light guide plate, a liquid crystal panel over the backlight unit, a top frame covering edges of the liquid crystal panel and combined with the main frame and the bottom frame, wherein the top frame includes a plurality of separable portions.

16 Claims, 4 Drawing Sheets

TOP FRAME WITH SEPARABLE PORTIONS FOR A LIQUID CRYSTAL DISPLAY DEVICE

The present invention claims the benefit of Korean Patent Application No. 2005-0054535 filed in Korea on Jun. 23, 2005, which is hereby incorporated by reference.

BACKGROUND OF THE INVENTION

1. Field of the Invention

The present invention relates to a liquid crystal display (LCD) device, and more particularly, to a top frame for an LCD device, an LCD device including the same, and a manufacturing method thereof.

2. Discussion of the Related Art

LCD devices make use of optical anisotropy and polarization properties of liquid crystal molecules to produce images. Specifically, since the liquid crystal molecules have a definite alignment as a result of their long, thin shapes and are arranged to have initial pre-tilt angles, an alignment direction of the liquid crystal molecules can be controlled by applying an electric field. Accordingly, variations in the applied electric field influences the alignment of the liquid crystal molecules. Due to the optical anisotropy, the refraction of incident light depends on the alignment direction of the liquid crystal molecules. Thus, by properly controlling the applied electric field, an image that has a desired brightness can be produced.

In general, LCD devices include an upper substrate and a lower substrate facing each other with liquid crystal molecules interposed therebetween. Each substrate has an electrode on the inner surface thereof, and an electric field is generated by applying a voltage to the electrodes, thereby driving the liquid crystal molecules to display images in accordance with the light transmittance.

Since LCD devices do not emit light, an additional light source is necessary to produce visible images. Accordingly, LCD devices display images by disposing a backlight assembly at a backside thereof and transmitting light from the backlight.

FIG. 1 is a perspective assembly view of an LCD device according to the related art. In FIG. 1, a LCD device includes a liquid crystal panel 11, a backlight assembly 20, a main frame 27, a bottom frame 35, and a top frame 13. The backlight assembly 20 and the liquid crystal panel 11 are sequentially disposed on an upper surface of the main frame 27, which has an opened side and has a substantially rectangular shape. The bottom frame 35 is combined with the main frame 27 along the opened side to prevent transformation of the main frame 27. To fix the above elements, the top frame 13 is combined with the main frame 27 and the bottom frame 35, and the top frame 13 covers front edges of the liquid crystal panel 11.

In FIG. 1, a printed circuit board 17 is connected to at least one side of the liquid crystal panel 11 through a flexible printed circuit board 15. In addition, the backlight unit 20 includes a lamp 29, a reflecting plate 25, a light guide plate 23, and optical sheets 21. The reflecting plate 25 of white or silver color is disposed on the upper surface of the main frame 27, the light guide plate 23 is situated on the reflecting plate 25, and the optical sheets 21 are located on the light guide plate 23. The lamp 29 has lamp holders 31 at both ends thereof and is disposed at a side of the light guide plate 23. The lamp 29 is also disposed at the opened side of the main frame 27, and a lamp guide 33 covers the lamp 29 and exposes a side of the lamp 29 adjacent to the light guide plate 23.

In FIG. 1, the top frame 13 is folded and has an inverted "L" shape to cover the front and side edges of the LCD device. In addition, the top frame 13 is opened at a front part, and images from the liquid crystal panel 11 are displayed through the opened front part of the top frame 13. The top frame 13 is manufactured by cutting a metal plate into a certain size of a rectangular shape, forming a rectangular opening in the cut metal plate, and bending and drawing the cut metal plate to have an inverted "L" shape. Here, the rectangular opening is formed through a punching process cutting a part of the cut metal plate. However, the part of the cut metal plate for the rectangular opening has a relatively large area, and the part of the cut metal plate is wasted. Accordingly, manufacturing costs are increased.

SUMMARY OF THE INVENTION

Accordingly, the present invention is directed to a top frame for a liquid crystal display device, a liquid crystal display device including the same, and a manufacturing method thereof that substantially obviate one or more of the problems due to limitations and disadvantages of the related art.

An object of the present invention is to provide a top frame for a liquid crystal display device that reduces manufacturing costs.

Another object of the present invention is to provide a liquid crystal display device including a top frame that reduces manufacturing costs, and a manufacturing method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a bottom frame, a main frame over the bottom frame and having a substantially rectangular shape, a backlight unit over the main frame, the backlight unit including a reflecting plate, a light guide plate over the reflecting plate, a lamp at one side of the light guide plate, a lamp guide covering the lamp, and optical sheets over the light guide plate, a liquid crystal panel over the backlight unit, and a top frame covering edges of the liquid crystal panel and combined with the main frame and the bottom frame, wherein the top frame includes a plurality of separable portions.

In another aspect, a method for manufacturing a liquid crystal display device includes providing a bottom frame, providing a main frame over the bottom frame and having a substantially rectangular shape, providing a backlight unit over the main frame, the backlight unit including a reflecting plate, a light guide plate over the reflecting plate, a lamp at one side of the light guide plate, a lamp guide covering the lamp, and optical sheets over the light guide plate, providing a liquid crystal panel over the backlight unit, and providing a top frame covering edges of the liquid crystal panel and combined with the main frame and the bottom frame, wherein the top frame includes a plurality of separable portions.

In another aspect, a frame device for a liquid crystal display device includes a top frame covering edges of a liquid crystal panel of the liquid crystal display device and combined with a main frame and a bottom frame connected to the liquid crystal panel, wherein the top frame includes a plurality of separable portions including a first portion having at least one fixing projection formed at each perpendicular side of the first portion, a second portion having at least one fixing hole formed at each perpendicular side of the second portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, an example of which is illustrated in the accompanying drawings.

Figure 1:
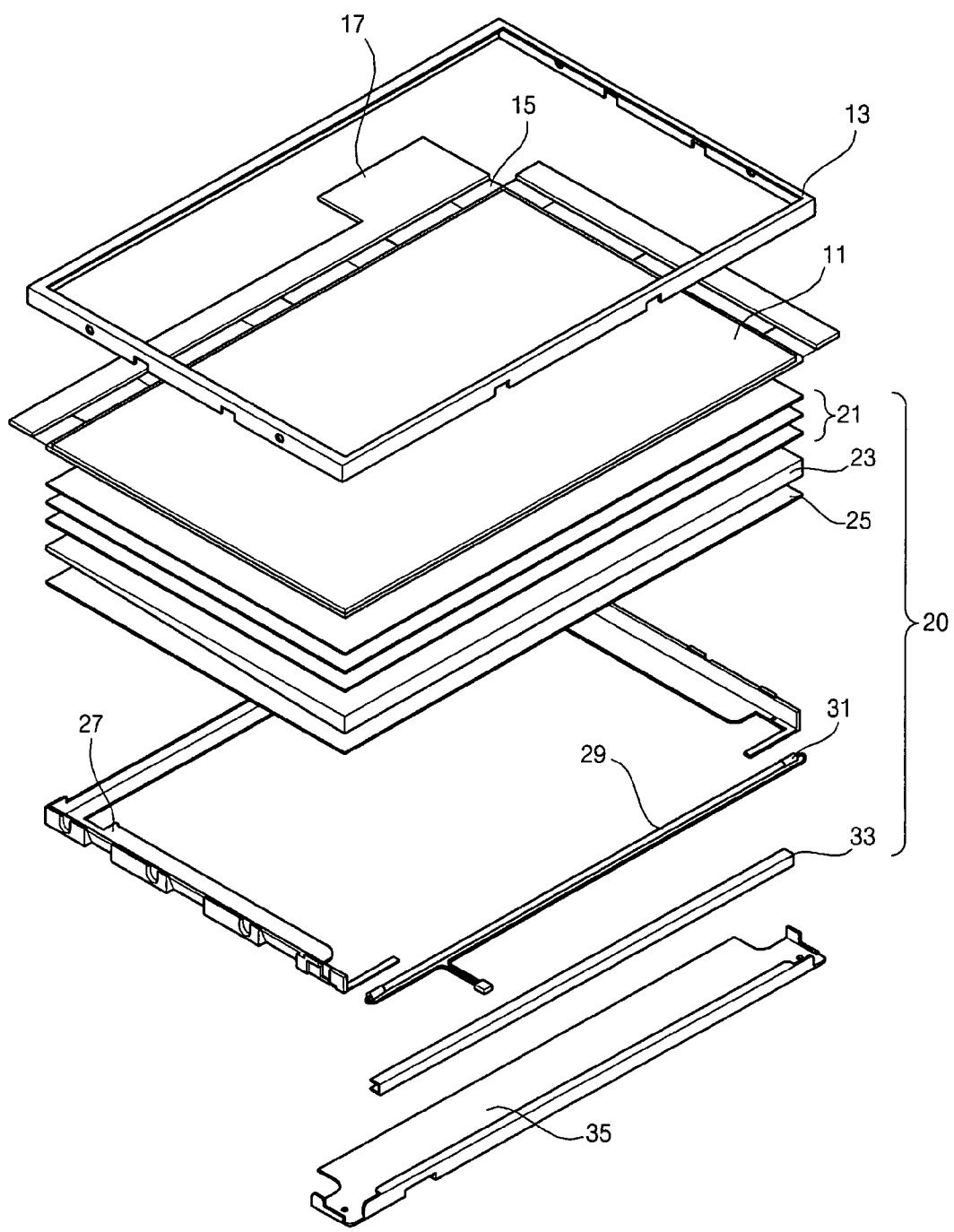
FIG. 1 is a perspective assembly view of an LCD device according to the related art.
Figure 2:
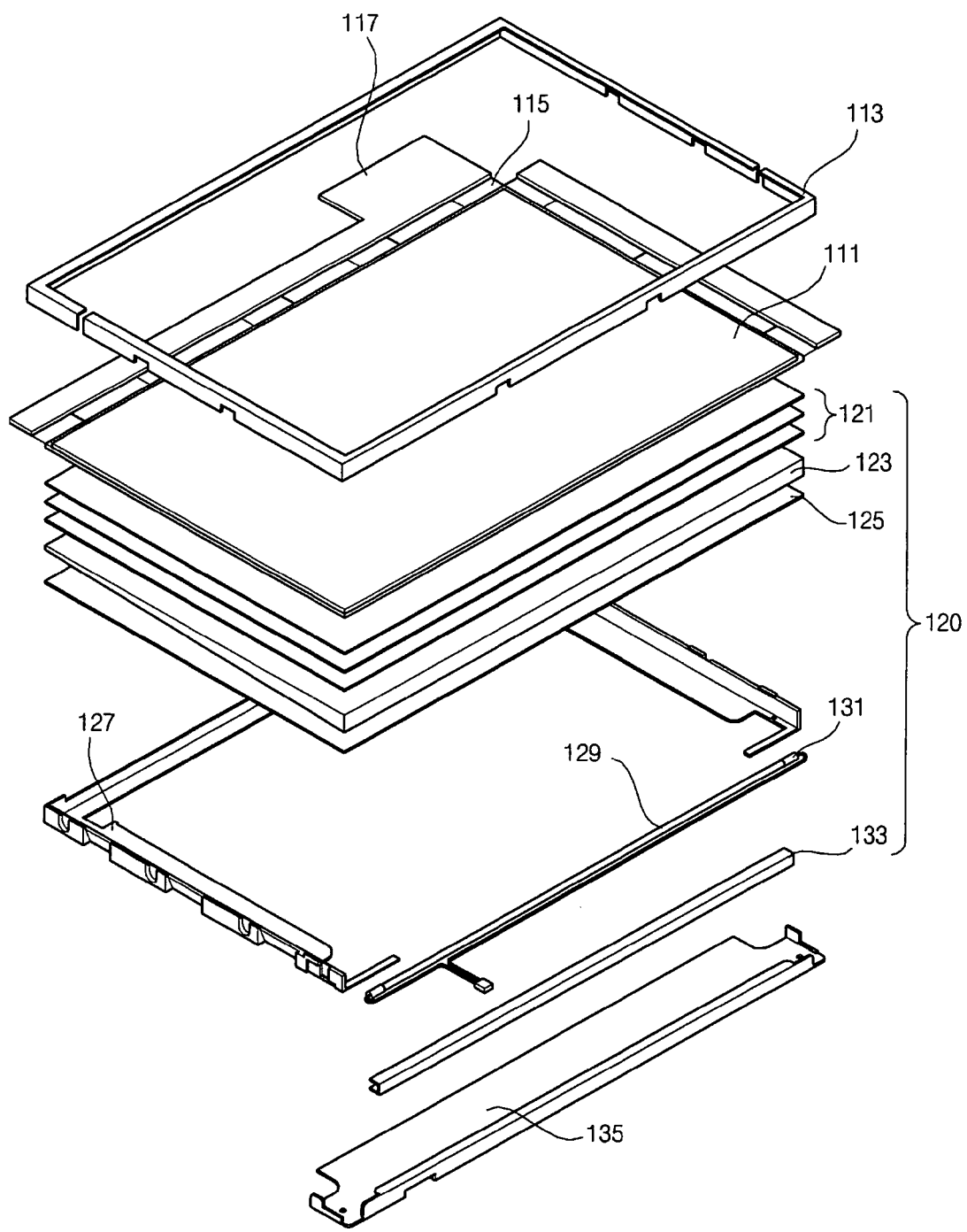
FIG. 2 is a perspective assembly view of an exemplary LCD device according to the present invention.

FIG. 2 is a perspective assembly view of an exemplary LCD device according to the present invention. In FIG. 2, an LCD device includes a liquid crystal panel 111, a backlight assembly 120, a main frame 127, a bottom frame 135, and a top frame 113. The backlight assembly 120 and the liquid crystal panel 111 are sequentially disposed on an upper surface of a lower side of the main frame 127, which has an opened side and has a substantially rectangular shape. The bottom frame 135 is disposed along a rear surface of the main frame 127 at the opened side and is combined with the main frame 127 to prevent transformation of the main frame 127. To fix the above elements, the top frame 113 is combined with the main frame 127 and the bottom frame 135, and the top frame 113 covers front edges of the liquid crystal panel 111. Here, the top frame 113 includes two portions that are separable.

In FIG. 2, a printed circuit board 117 is connected to at least one side of the liquid crystal panel 111 through a flexible printed circuit board 115. The backlight unit 120 includes a lamp 129, a reflecting plate 125, a light guide plate 123, and optical sheets 121. The reflecting plate 125 having a reflective color surface, such as white and silver, is disposed on the upper surface of the lower side of the main frame 127, the light guide plate 123 is situated on the reflecting plate 125, and the optical sheets 121 are located on the light guide plate 123. The lamp 129 has lamp holders 131 at both ends thereof and is disposed at a side of the light guide plate 123. The lamp 129 is also disposed at the opened side of the main frame 127, and a lamp guide 133 covers the lamp 129 and exposes a side of the lamp 129 adjacent to the light guide plate 123.

Figure 3:
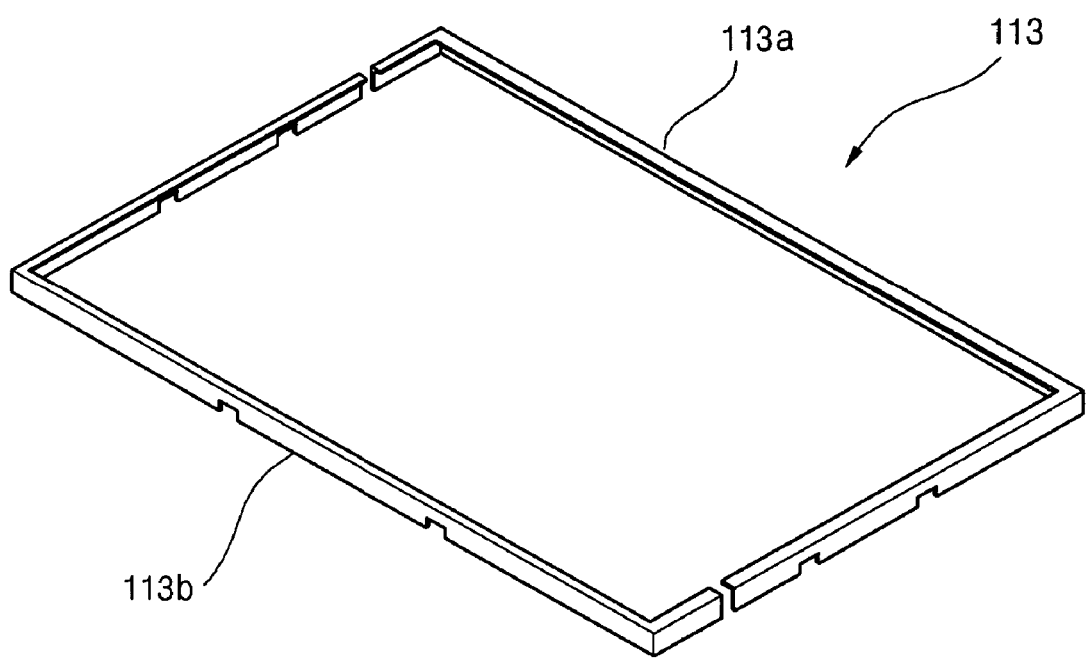
FIG. 3 is a schematic perspective view of an exemplary top frame of FIG. 2 according to the present invention.

FIG. 3 is a schematic perspective view of an exemplary top frame of FIG. 2 according to the present invention. In FIG. 3, the top frame 113 is folded and has an inverted "L" shape to cover the front and side edges of the LCD device. The top frame 113 is opened at a front part, and images from the liquid crystal panel 111 of FIG. 2 are displayed through the opened front part of the top frame 113. The top frame 113 is separated at parts adjacent opposite corners, and the top frame 113 includes first and second portions 113a and 113b. The first and second portions 113a and 113b may have the same shape, and each of the first and second portions 113a and 113b has two sides perpendicular to each other. The first and second portions 113a and 113b are combined with each other at the two sides to cover the edges of the LCD device.

In FIG. 3, the top frame 113 may include four portions, each of which corresponds to one side of the LCD device. For example, the four portions may have a linear shape. In addition, the top frame 113 is formed by cutting and then bending a metal plate to form each portion and by combining the portions. According to the present invention, since the top frame 113 includes separable portions, wasted parts of the metal plate are reduced when the top frame 113 is formed, thereby reducing manufacturing costs.

Figure 4A:
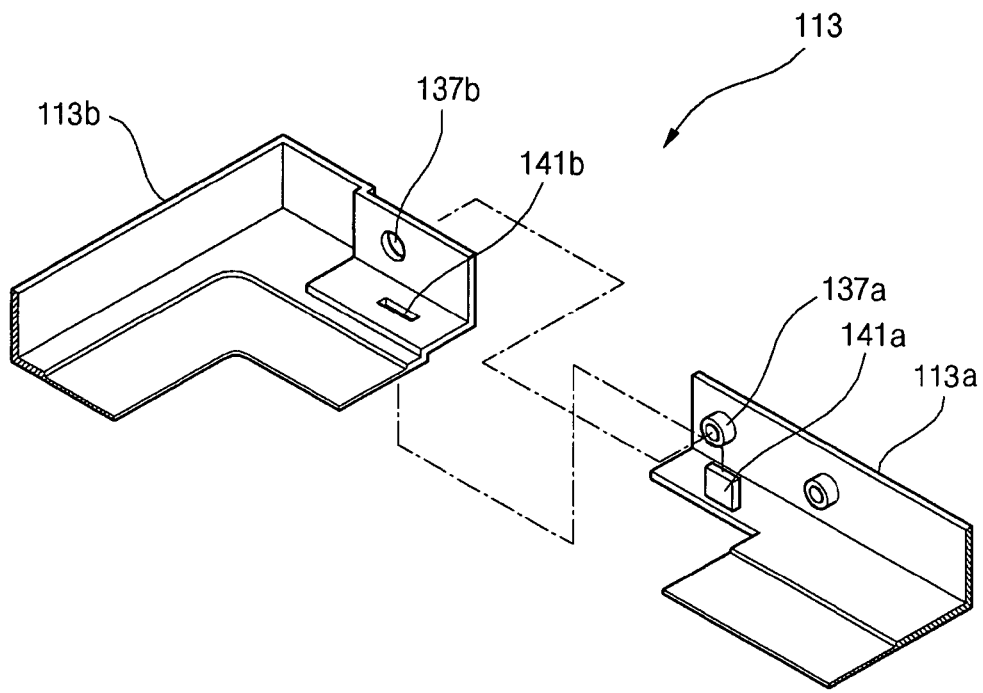
FIG. 4A is a schematic perspective assembly view of exemplary connection parts of a top frame according to the present invention.
Figure 4B:
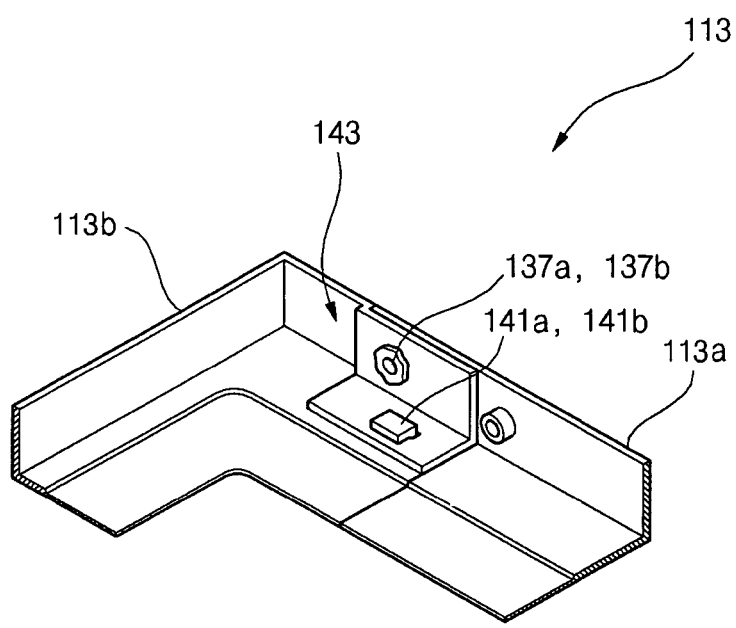
FIG. 4B is a schematic perspective view of exemplary assembled connection parts of FIG. 4A of the top frame according to the present invention.

FIG. 4A is a schematic perspective assembly view of exemplary connection parts of a top frame according to the present invention, and FIG. 4B is a schematic perspective view of exemplary assembled connection parts of FIG. 4A of the top frame according to the present invention. In FIG. 4A, the top frame 113 includes first and second portions 113a and 113b, wherein the first portion 113a has a first fixing projection 137a and a second fixing projection 141a on an inner surface thereof. In addition, the second portion 113b of the top frame 113 has a first fixing hole 137b and a second fixing hole 141b on an inner surface thereof. The first and second fixing projections 137a and 141a are combined with the first and second fixing holes 137b and 141b, respectively. To increase the degree of connection, more than two fixing projections and fixing holes are formed in two sides of the first and second portions 113a and 113b. For example, the first fixing projection 137a and the first fixing hole 137b are formed in side inner surfaces of the first and second portions 113a and 113b, respectively, and the second fixing projection 141a and the second fixing hole 141b are formed in front inner surfaces of the first and second portions 113a and 113b, respectively.

In FIG. 4A, the first fixing projection 137a and the first fixing hole 137b may have a circular shape. Accordingly, the second fixing projection 141a and the second fixing hole 141b may have a circular shape or may have a rectangular shape for an LCD device having a limited space, such as a notebook monitor, to avoid interference with the liquid crystal panel.

In FIG. 4B, the top frame 113 is assembled through a rivet connecting method inserting the first and second fixing projections 137a and 141a into the first and second fixing holes 137b and 141b, respectively, and then hammering the first and second fixing projections 137a and 141a and the first and second fixing holes 137b and 141b. Parts for the first and second fixing projections 137a and 141a of the first portion 113a and parts for the first and second fixing holes 137b and 141b of the second portion 113b are overlapped with each other, and thus an overlapping part 143 is formed. For example, the parts for the first and second fixing holes 137b and 141b stand out inward as compared to the first portion 113a and other parts of the second portion 113b, and the parts for the first and second fixing projections 137a and 141a coincide with the parts for the first and second fixing holes 137b and 141b. Accordingly, the overlapping part 143 has an outer surface on a level with outer surfaces of the first and second portions 113a and 113b, as shown in FIG. 4B, and a space for the top frame 113 is minimized in the LCD device.

According to the present invention, since the top frame 113 is separated and more than two fixing elements 137a, 137b, 141a and 141b are formed on side and front inner surfaces of the top frame 113, the strength of the top frame 113 is increased. Furthermore, the top frame 113 can be used for confined LCD devices, such as notebook monitors. In addition, wasted parts of a metal plate for the top frame 113 are reduced, and manufacturing costs are decreased.

It will be apparent to those skilled in the art that various modifications and variations can be made in the top frame for a liquid crystal display device and a liquid crystal display device including the same of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
 a bottom frame;
 a main frame over the bottom frame and having a substantially rectangular shape;
 a backlight unit over the main frame, the backlight unit including a reflecting plate, a light guide plate over the reflecting plate, a lamp at one side of the light guide plate, a lamp guide covering the lamp, and optical sheets over the light guide plate;
 a liquid crystal panel over the backlight unit; and
 a top frame covering front and side edges of the liquid crystal panel and combined with the main frame and the bottom frame, wherein the top frame includes separable first and second portions, wherein each of the first and second portions has first and second sides perpendicular with each other, wherein the first side corresponds to the front edge of the liquid crystal panel and the second side corresponds to the side edge of the liquid crystal panel, wherein the first portion further includes a first overlapping part that has third and fourth sides extending from the first and second sides of the first portion, respectively, wherein the third side has a narrower width than the first side of the first portion and the fourth side has a same width as the second side of the first portion, wherein the second portion includes a second overlapping part corresponding to the first overlapping part, and at least one fixing projection and at least one fixing hole are disposed on inner surfaces of the first and second portions, respectively, wherein the at least one fixing projection and the at least one fixing hole are disposed in the first and second overlapping parts of the first and second portions, respectively, and the second overlapping part of the second portion stands out inward toward the liquid crystal panel as compared with the first portion and the other parts of the second portion excluding the second overlapping part such that the first and second overlapping parts of the first and second portions have an outer surface on a level with outer surfaces of the first and second portions and the first side of the first portion makes a side contact with the first side of the second portion excluding the second overlapping part when the first and second portions are combined.

2. The device according to claim 1, wherein the top frame further includes separable third and fourth portions.

3. The device according to claim 1, wherein at least one fixing projection is formed at each of the first and second sides of the first portion and at least one fixing hole is formed at each of the first and second sides of the second portion.

4. The device according to claim 1, wherein the at least one fixing projection and the at least one fixing hole have one of a circular shape and a rectangular shape.

5. The device according to claim 1, wherein the first portion is combined with the second portion through a rivet connection method using the at least one fixing projection and the at least one fixing hole by inserting the at least one fixing projection into the at least one fixing hole and hammering the at least one fixing projection and the at least one fixing hole.

6. The device according to claim 1, wherein the first and second portions have a same shape.

7. The device according to claim 1, wherein the outer surface of the second overlapping part overlaps and faces an inner surface of the first overlapping part.

8. A method for manufacturing a liquid crystal display device, comprising:
 providing a bottom frame;
 providing a main frame over the bottom frame and having a substantially rectangular shape;
 providing a backlight unit over the main frame, the backlight unit including a reflecting plate, a light guide plate over the reflecting plate, a lamp at one side of the light guide plate, a lamp guide covering the lamp, and optical sheets over the light guide plate;
 providing a liquid crystal panel over the backlight unit; and
 providing a top frame covering front and side edges of the liquid crystal panel and combined with the main frame and the bottom frame,
 wherein providing the top frame includes forming a first portion by cutting and then bending a metal plate, forming a second portion by cutting and then bending a metal plate, and combining the first and second portions, wherein each of the first and second portions has first and second sides perpendicular with each other, wherein the first side corresponds to the front edge of the liquid crystal panel and the second side corresponds to the side edge of the liquid crystal panel, wherein the first portion further includes a first overlapping part that has third and fourth sides extending from the first and second sides of the first portion, respectively, wherein the third side has a narrower width than the first side of the first portion and the fourth side has a same width as the second side of the first portion, wherein the second portion includes a second overlapping part corresponding to the first overlapping part, wherein at least one fixing projection and at least one fixing hole are disposed on inner surfaces of the first and second portions, respectively, wherein the at least one fixing projection and the at least one fixing hole are disposed in the first and second overlapping parts of the first and second portions, respectively, and the second overlapping part of the second portion stands out inward toward the liquid crystal panel as compared with the first portion and the other parts of the second portion excluding the second overlapping part such that the first and second overlapping parts of the first and second portions have an outer surface on a level with outer surfaces of the first and second portions and the first side of the first portion makes a side contact with the first side of the second portion excluding the second overlapping part when the first and second portions are combined.

9. The method according to claim 8, wherein the at least one fixing projection and the at least one fixing hole have one of a circular shape and a rectangular shape.

10. The method according to claim 8, wherein combining the first and second portions includes inserting the at least one fixing projection into the at least one fixing hole, and hammering the at least one fixing projection and the at least one fixing hole.

11. The method according to claim 8, wherein the outer surface of the second overlapping part overlaps and faces an inner surface of the first overlapping part.

12. A frame device for a liquid crystal display device, comprising:

a top frame covering front and side edges of a liquid crystal panel of the liquid crystal display device and combined with a main frame and a bottom frame connected to the liquid crystal panel, wherein the top frame includes a plurality of separable portions including a first portion having at least one fixing projection formed at each perpendicular side on an inner surface of the first portion, and a second portion having at least one fixing hole formed at each perpendicular side on an inner surface of the second portion, wherein each of the first and second portions has first and second sides perpendicular with each other, wherein the first side corresponds to the front edge of the liquid crystal panel and the second side corresponds to the side edge of the liquid crystal panel, wherein the first portion further includes a first overlapping part that has third and fourth sides extending from the first and second sides of the first portion, respectively, wherein the third side has a narrower width than the first side of the first portion and the fourth side has a same width as the second side of the first portion, wherein the second portion includes a second overlapping part corresponding to the first overlapping part, wherein the at least one fixing projection and the at least one fixing hole are disposed in the first and second overlapping parts of the first and second portions, respectively, and the second overlapping part of the second portion stands out inward toward the liquid crystal panel as compared with the first portion and the other parts of the second portion excluding the second overlapping part such that the first and second overlapping parts of the first and second portions have an outer surface on a level with outer surfaces of the first and second portions and the first side of the first portion makes a side contact with the first side of the second portion excluding the second overlapping part when the first and second portions are combined.

13. The device according to claim 12, wherein the at least one fixing projection and the at least one fixing hole have one of a circular shape and a rectangular shape.

14. The device according to claim 12, wherein the first portion is combined with the second portion through a rivet connection method using the at least one fixing projection and the at least one fixing hole by inserting the at least one fixing projection into the at least one fixing hole and hammering the at least one fixing projection and the at least one fixing hole.

15. The device according to claim 12, wherein the first and second portions have a same shape.

16. The device according to claim 12, wherein the outer surface of the second overlapping part overlaps and faces an inner surface of the first overlapping part.

* * * * *